US008315594B1

(12) United States Patent
Mauser et al.

(10) Patent No.: US 8,315,594 B1
(45) Date of Patent: Nov. 20, 2012

(54) SELECTING A SERVICE PLAN BASED ON PROJECTED USAGE REQUIREMENTS

(75) Inventors: Edward Ronald Mauser, Irvine, CA (US); Andy G. Young, Alpharetta, GA (US)

(73) Assignee: Cellco Partnership, Basking Ridge, NJ (US)

( * ) Notice: Subject to any disclaimer, the term of this patent is extended or adjusted under 35 U.S.C. 154(b) by 456 days.

(21) Appl. No.: 12/579,174

(22) Filed: Oct. 14, 2009

(51) Int. Cl.
*H04M 11/00* (2006.01)
*H04M 3/42* (2006.01)
*G06Q 30/00* (2012.01)

(52) U.S. Cl. .................. 455/406; 455/414.1; 705/27
(58) Field of Classification Search .......... 455/406, 455/414, 425, 405; 705/27.1
See application file for complete search history.

(56) References Cited

U.S. PATENT DOCUMENTS

| 6,574,465 | B2 | 6/2003 | Marsh et al. |
| 6,606,377 | B2 | 8/2003 | Ruckart et al. |
| 6,681,106 | B2 | 1/2004 | Marsh et al. |
| 6,885,997 | B1 | 4/2005 | Roberts |
| 7,006,980 | B1 | 2/2006 | Snyder |
| 8,005,726 | B1 * | 8/2011 | Bao .................... 705/27.1 |
| 2003/0014271 | A1 | 1/2003 | Hwang |
| 2008/0207182 | A1 * | 8/2008 | Maharajh et al. ......... 455/414.1 |

\* cited by examiner

*Primary Examiner* — Kent Chang
*Assistant Examiner* — Kuo Woo

(57) ABSTRACT

An exemplary website allows a user to input projected usage requirements as user inputs including usage levels of mobile services and other desired services or features for the user and/or other persons intended for coverage under a chosen service plan. The exemplary website selects and suggests to the user a service plan based upon the user inputs, resulting in the lowest monthly cost to the user, among different service plans available form a mobile carrier or wireless service provider. In addition, in the example, the user may share with another person information relating to the selected service plan via an electronic messaging service or proceed to purchase the selected service plan.

17 Claims, 15 Drawing Sheets

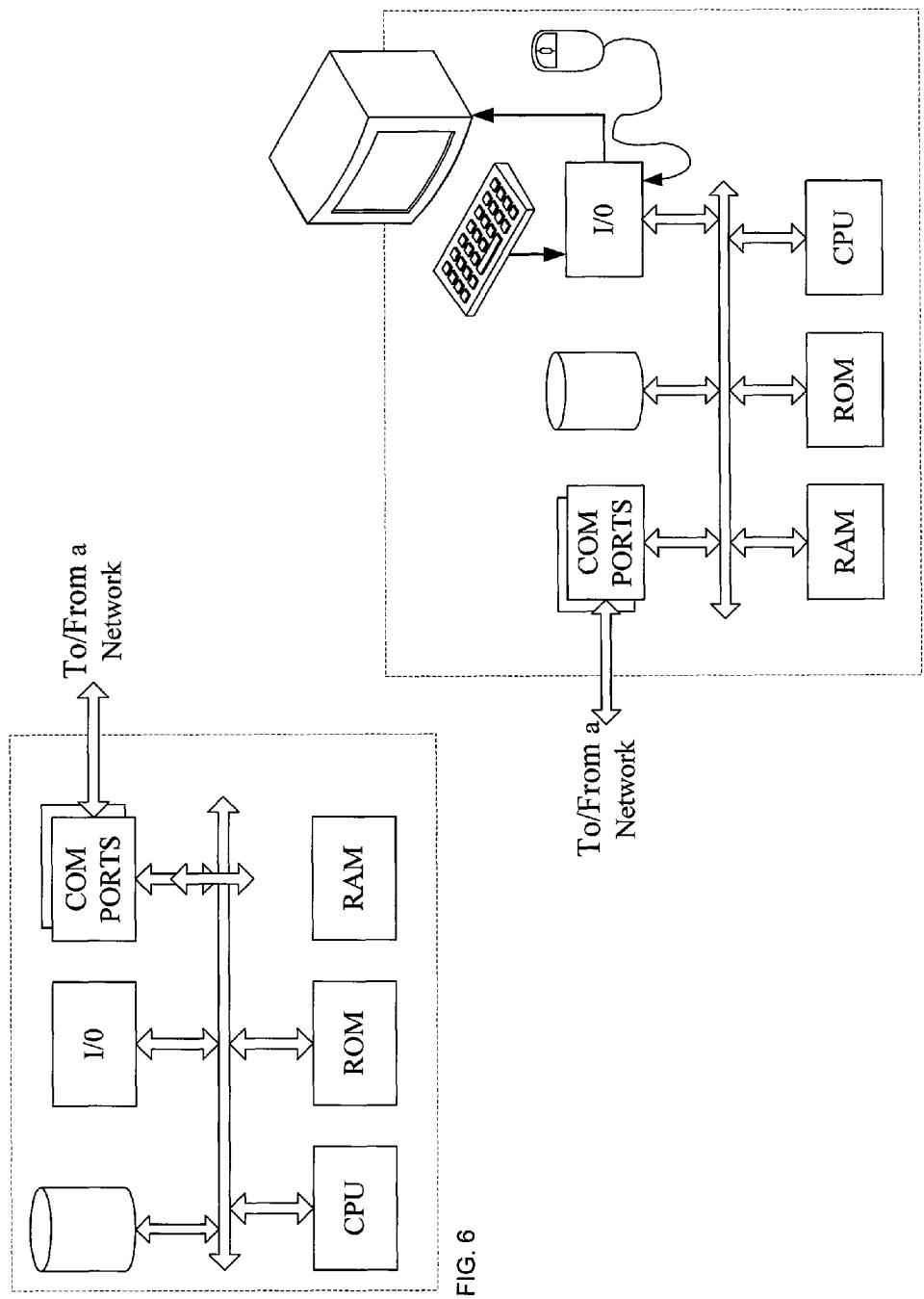

SELECTING A SERVICE PLAN BASED ON PROJECTED USAGE REQUIREMENTS

TECHNICAL FIELD

The present subject matter relates to techniques and equipment to provide a user, via a network, a selection of a service plan, based on projected usage and selection requirements inputted by the user, from among different plans offered by a mobile carrier or wireless service provider in telecommunications industry, particularly, in such a manner as to allow the user, via the network, to buy the service plan selected.

BACKGROUND

In recent years, mobile services offerings have been expanded greatly, which has given rise to a large number of available service plans with many different options and features. As a result, because of the large number of available service plans to choose from, each potential customer often faces a challenge to determine and purchase the best service plan for him or her from among the many different available service plans. Further, the potential customers often become frustrated at an extreme amount of information to digest before making an informed purchase decision. Typically, for purchasing a mobile service plan, potential customers would visit a local store of a mobile carrier or wireless service provider and, before purchasing, spend quite some time in discussing and consulting with store representatives in order to determine a best service plan fitting their needs and/or their family needs.

Alternatively, potential customers can navigate to a website of a mobile carrier or wireless service provider, but may find themselves frustrated because they have to spend a great deal of time in researching on different service plans before selecting a service plan as well as the number of mobile phones or numbers and minutes they would approximately use per month. This could be a very frustrating experience to many potential customers. Thus, the disadvantage to this method is that the potential customers may have to be familiar with various service plans including different features and options, service offerings, pricing information, fee information, etc., and choose, often on their own, a service plan that will likely fit their needs. However, the customers may choose and likely end up with a service plan that is not truly the best fit based on their future needs and service usage requirements.

SUMMARY

The teachings herein alleviate one or more of the above noted problems with purchasing a best-fit service plan by potential customers among many different service plans available from a mobile carrier or wireless service provider. Because of a great number of different features and options available on different service plans, selecting a best-fit service plan that fits the customers' needs and their family needs can be a daunting, challenging task requiring an intimate knowledge and detailed understanding of each service plan including its pricing information, fee information, additional features and/or service offerings.

Hence a need exists for a method or tool for allowing potential customers to conveniently input their projected needs or usage requirements of wireless services, via a network, including projected usage levels of mobile services and/or other enhanced data services, and receive, via the network, a selection of a service plan available from the mobile carrier or wireless service provider, that is a truly best fit for their needs based upon the projected usage requirements.

Such a method may be implemented on a computer connected to a network for allowing potential customers to conveniently input their projected needs or usage requirements of wireless services and other desired services and receive a selection of a service plan from a mobile carrier or wireless service provider. Such a method may involve receiving user inputs, from a user via a network, of projected usage levels of at least two mobile services of a mobile carrier or wireless service provider. In a specific example, the user inputs the projected usage levels of mobile services are for a plurality of persons intended for coverage by the chosen service plan. The computer processes the user inputs of the projected usage levels of the mobile services and information related to at least two service plans available from the mobile carrier or wireless service provider, including fee information for usage of the mobile services to determine, as the chosen service plan, a service plan offering the lowest total monthly cost among the at least two available service plans for the projected usage levels. The computer sends to the user, via the network, information relating to the chosen service plan.

In a specific example, a user at a terminal device serving as a client may navigate to a web page where the user can input projected usage requirements including projected usage levels of mobile services and selection of enhanced data services for the user and/or other person(s) to be covered under a service plan available from the mobile carrier or wireless service provider. A server receives the user inputs via a network from the terminal device and processes them, calculating total monthly costs of available service plans from the mobile carrier or wireless service provider based on the inputted projected usage requirements and pricing information related to the available service plans. The server then selects a service plan resulting in the lowest total monthly cost to the user as a best-fit service plan from among the available service plans and sends to the terminal device via the network information relating to the selected service plan as a suggestion to the user. In the example, the user may also review and purchase the selected service plan. When the user decides to buy the selected service plan, the user is directed to a purchasing web page for further processing. Also, the user may share with others the information relating to the selected service plan through an electronic messaging service. When a person receives, via the electronic messaging service, the information relating to the selected service plan, the person is given an option to purchase the selected service plan or an option to build and/or select his or her own service plan.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 6 is a simplified functional block diagram of a server for use as the server; and FIG. 7 is a simplified functional block diagram of a personal computer, other work station, or terminal device.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings. Further, in an example below, even though an example of selecting a service plan for a group of at least two persons is discussed, those who are ordinarily skilled in the art may implement an example, without any difficulty, for a single person.

Figure 1:
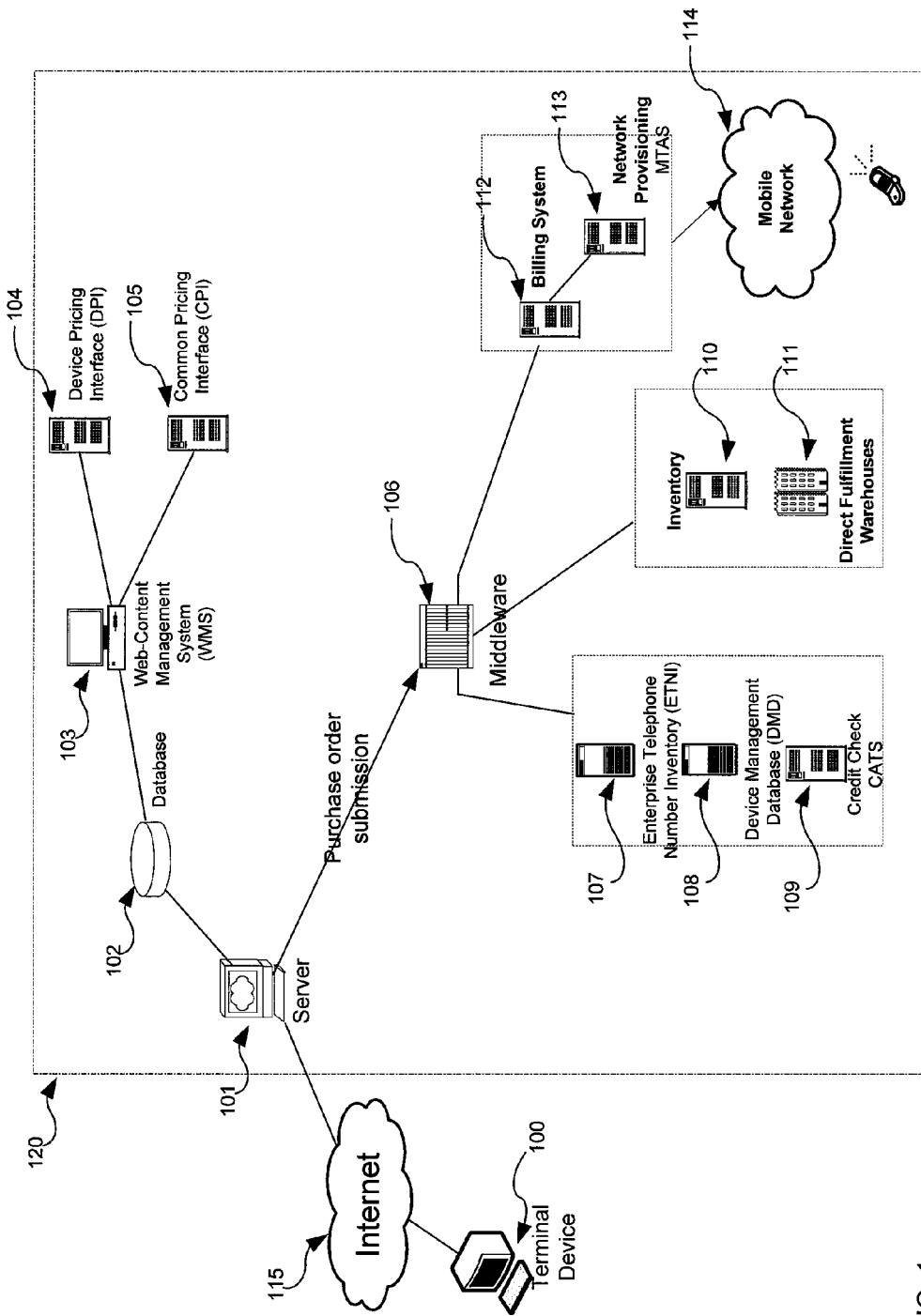
FIG. 1 is a simplified block diagram of a system for allowing a user to receive information about a selected mobile service plan intended to offer a lowest cost for use based on indicated projected usage and/or features, and to allow the user to buy the mobile service plan, if desired.

Reference now is made in detail to the examples illustrated in the accompanying drawings and discussed below. FIG. 1 is a simplified block diagram of a system allowing a user at a terminal device to purchase a service plan, in a client-server paradigm. For example, a terminal device 100 serving as a client is connected to, via a network, such as the public network now commonly known as the Internet 115. In this way, the terminal device 100 is capable of communicating to a server 101, via the network. In the example, the server 101 is located within a network 120 as an element of the network 120. The terminal device 100 could be one or more of any type of device capable of connecting to the Internet 115, including a web-based mobile communication device, an Internet phone, a personal computer, a workstation, a kiosk, a personal digital assistant, or any other web-based connectable device. The terminal device 100 may be connected to the Internet 115 through a variety of network interfaces, including both wired and wireless interfaces, such as a local area network, a wide area network, dial-in connections, cable modems, high-speed ISDN, etc. The server 101 is connected via a network link to the Internet 115 for data communication. The link of the server 101 to the Internet 115 can use any convenient fiber, wire or wireless transport technology providing sufficient data communication bandwidth to support traffic from users of the terminal devices 100.

Although one or more databases can be used, in the example, the server 101 is connected to a database 102 containing a variety of matters including information relating to different service plans available from a mobile carrier or wireless service provider. For example, the database 102 is a database of the mobile carrier or wireless service provider and the database 102 may include the information such as service plan pricing, device pricing, fee information, and other configuration data relating to available service plans. The database 102 is updated on a periodic basis by a Web Content Management System (WMS) 103 and the server 101 retrieves from the database 102 information relating to the available service plans as needed. The WMS 103 receives on a regular basis updates of reference data including mobile equipment pricing information from Device Pricing Interface 104 and service pricing and associated fee information from Common Pricing Interface 105.

In FIG. 1, a user at the terminal device 100 may navigate to a website, offered by the server 101, of a mobile carrier or wireless service provider. The server 101 sends a web page to the terminal device 100 via the network and the terminal device 100 in turn presents the web page as part of a graphical user interface to the user for receiving user inputs. The user operates the terminal device 100 to input projected user requirements, such as projected usage of mobile services and selection of enhanced services, as the user inputs for building or selecting a service plan for purchase from the mobile carrier or wireless service provider. The terminal device 100 communicates via the network to the server 101, and in turn, the server 101 communicates via the network to the terminal device 100 providing information relating to a selected or an optimal service plan chosen by the server 101 for presenting to the user. Here, an optimal service plan means a service plan meeting a certain set of requirements set by the server 101. The set of requirements may include, but is not limited to, projections of usage such as desired minutes and user desired enhanced feature(s) as well as cost to the prospective customer. For example, an optimal service plan can be defined as a service plan, among a plurality of service plans, resulting in the lowest cost to the prospective customer based on the projected requirements of the prospective customer.

When the user decides to purchase the chosen service plan selected by the server 101, a purchase order is generated by the server 101 and submitted to a middleware 106, which in turn communicates to a variety of systems within the network 120 of the mobile carrier or wireless service provider for further processing. The middleware 106 may be a system, implemented in middleware software, for processing, communicating, or distributing purchase orders among other systems or network elements within the network 120 as shown in FIG. 1. Even though the middleware 106 in FIG. 1 is shown as a standalone element of the network 120, it can be implemented in software as part of the server 101 providing substantially similar functionalities and serving as an intermediate software layer, or commonly referred to as "glue", between various applications and operating system of the server 101 or the server 101 and other network elements such as 107, 108, 109, 110, 111, 112, 113, etc.

For example, the middleware 106 communicates to an enterprise telephone number inventory system 107 to obtain a telephone number for use, to a device management database system 108 to validate a mobile phone equipment for use, and to a credit check/CATS system 109 to obtain credit information about the purchaser of the selected or optimal service plan. The credit information in the example may be provided by one or more of credit reporting agencies such as Equifax, TransUnion, Experian, CBI, etc. The middleware 108 also communicates to an inventory system 110 to check availability of the mobile phone equipment for shipment and to direct fulfillment warehouses 111 for direct delivery of the mobile phone equipment to the purchaser or subscriber. Further, the middleware 108 may communicate to a network provisioning system 113, also known as Mobile Telephone Administration System or "MTAS" and one or more billing systems 112. The MTAS, for example, provides data to a mobile network 114 to provision services for the new mobile phone equipment and modifies provisioning data as subscribers change their subscriptions to obtain different sets of services or features from the mobile carrier or wireless service provider. The billing systems 112 receive usage and operations data from the mobile network 114 and process that data to generate bills for each individual subscriber.

Figure 2A:
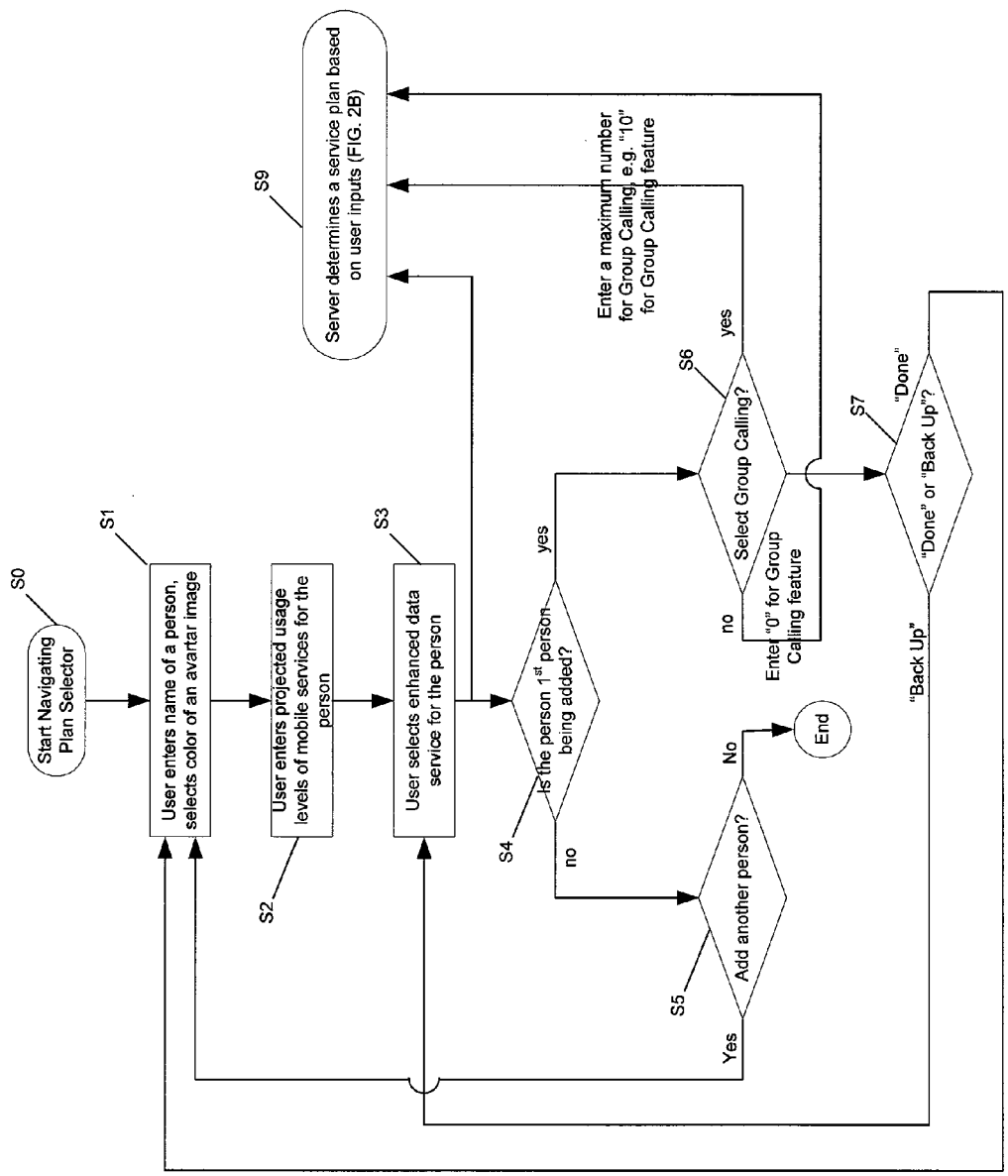
FIG. 2A is a flow chart of an exemplary process for entering projected usage requirements from a perspective of the user.

FIG. 2A is a flow chart of an exemplary process of entering projected usage requirements of mobile services and selecting enhanced data services and other desired features by a user at the terminal device 100 and responsive selection of a service plan. In the example, the user will navigate to a website of a mobile carrier or wireless service provider and then navigate to a particular web page such as a group calling plan page where the user can continue to navigate for entering user inputs. The group calling plan is for a group of designated friends and/or family members who may be called on a frequent basis. From the group calling plan page the user can continue to navigate, enter user inputs, and receive a suggestion of a service plan based on projected usage levels or requirements inputted by the user, as the server 101 sends one or more web pages or graphical user interfaces to the terminal device 100 for presenting to and interacting with the user.

Figure 2B:
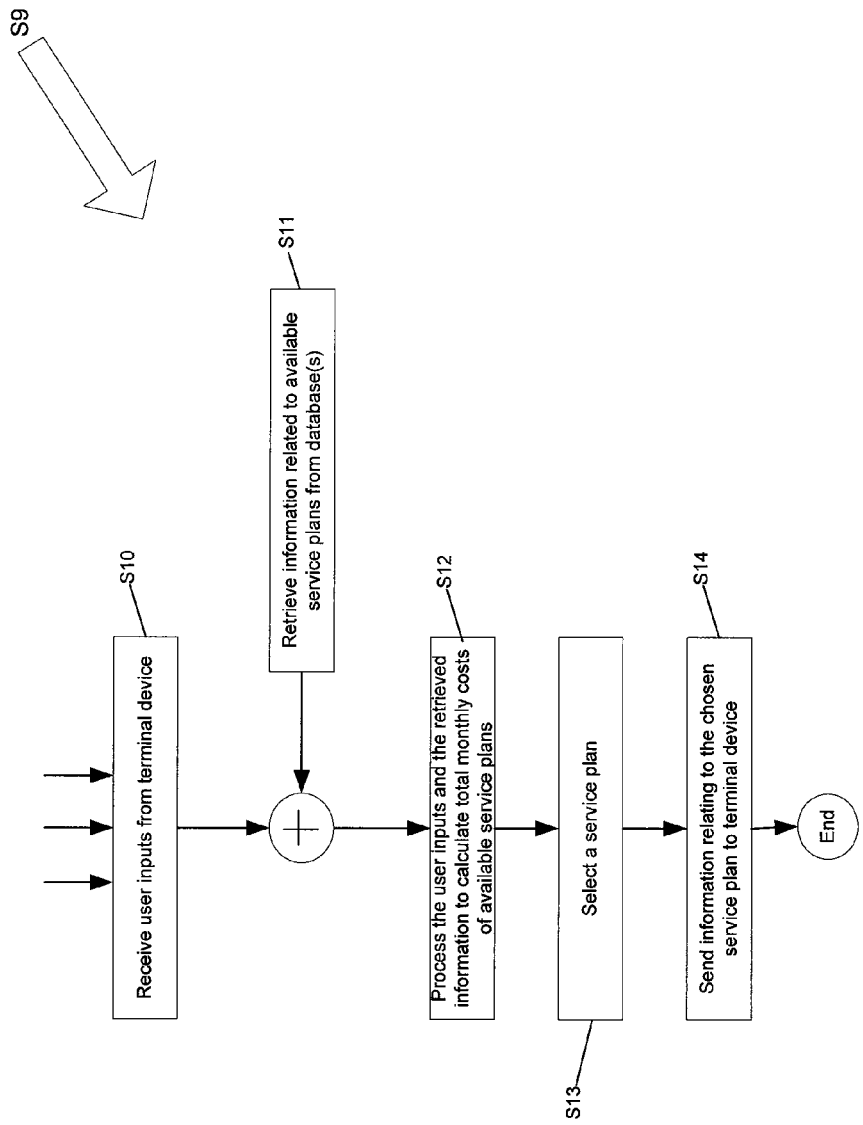
FIG. 2B is a flow chart of an exemplary process for selecting a service plan from a perspective of the server.
Figure 3B:
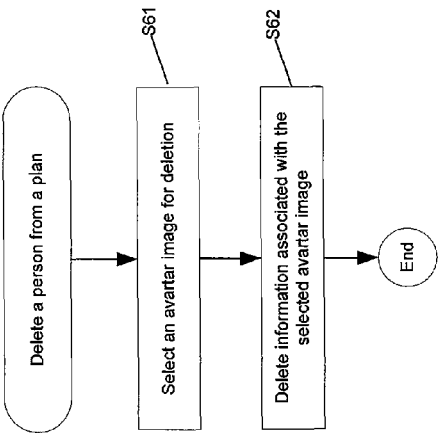
FIG. 3A-C are flow charts of exemplary processes for adding, deleting, and editing projected usage requirements.
Figure 3C:
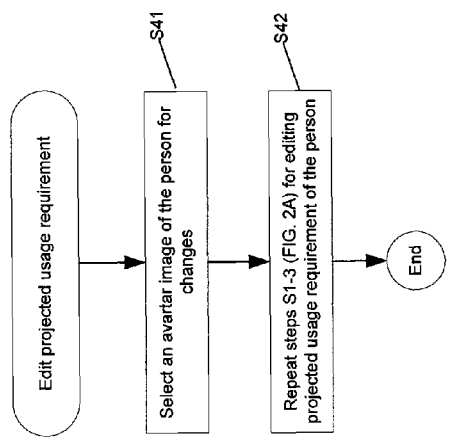
Figure 3A:
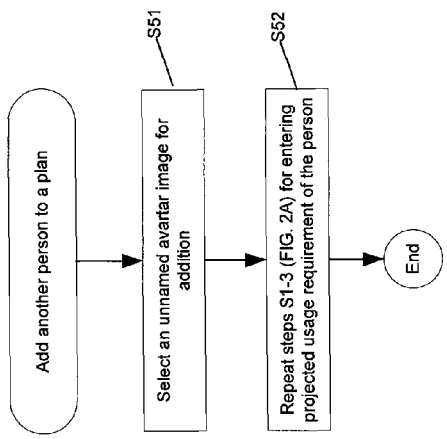
Figure 4:
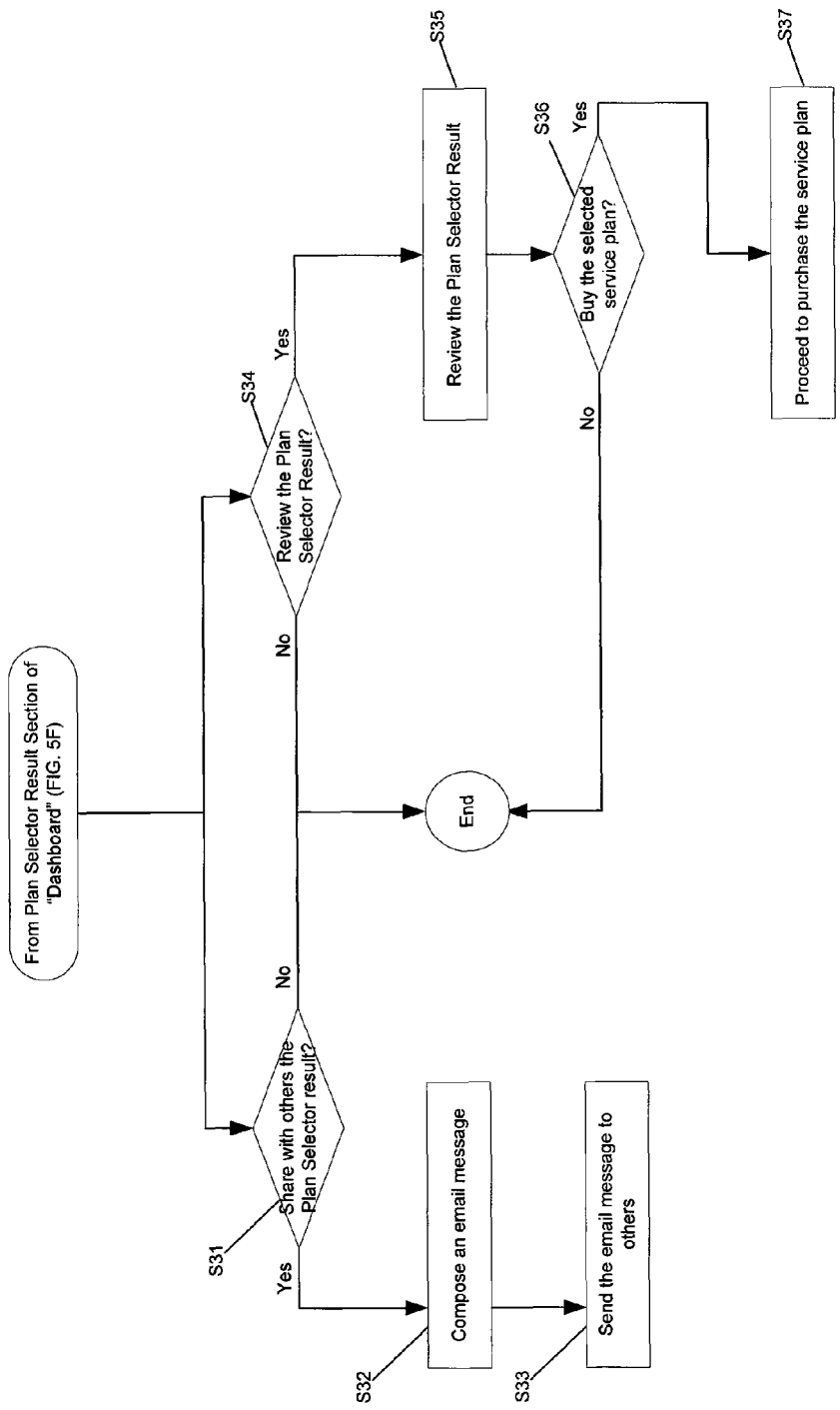
FIG. 4 is a flow chart of an exemplary process for reviewing and sharing with others information relating to the selected service plan.
Figure 5A:
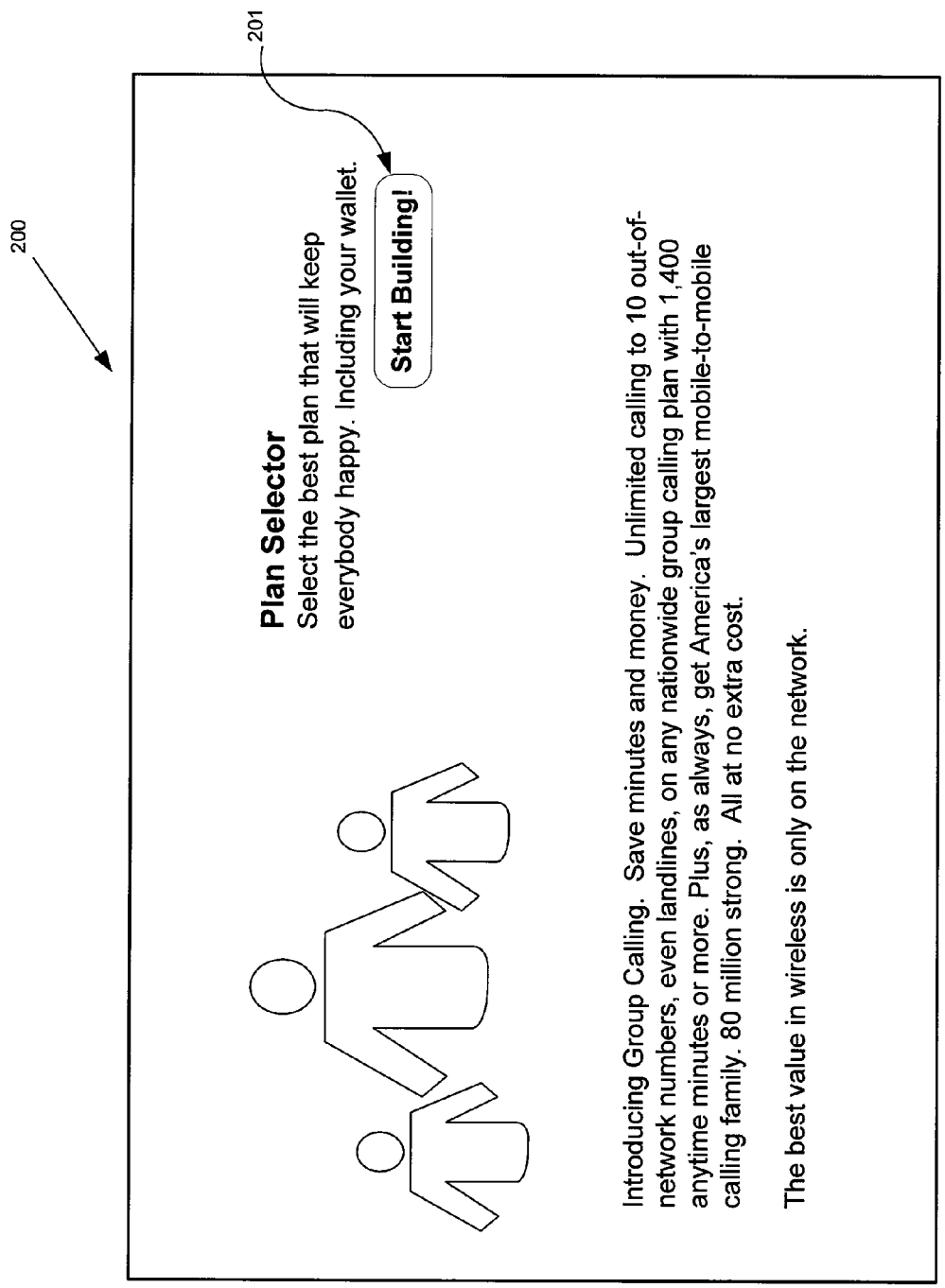
FIG. 5A-I are portions of exemplary graphical user interface pages or displays provided to the user during procedures in accord with FIGS. 2A, 2B, and 3.

At S0 of FIG. 2A, the user is presented with a start-up page of a "plan selector" for the group calling plan, such as shown in FIG. 5A. FIG. 5A is an exemplary start-up page of the plan selector, e.g., an example of a software application embodying procedures in accord with FIG. 2-4, implemented using Adobe Flex. Adobe Flex is a software development kit for development and deployment of cross-platform interactive web applications or rich Internet applications based on the Adobe Flash platform. Such cross-platform interactive web application or rich Internet applications can be written using Adobe Flex Builder or by using a freely available Flex compiler from Adobe. Alternatively, other software development kits for cross-platform interactive web applications or rich Internet applications can be used to implement the plan selector as those of skilled in the art are adequately familiar with. For example, other comparable technologies include Ajax (a shorthand for JavaScript and XML), XUL (XML User Interface Language), JavaFX and Windows Presentation Foundation technologies such as Silverlight. Adobe Flex applications (or other cross-platform interactive web applications or rich Internet applications or the like), enable web applications such as the plan selector, which resides in part on the terminal device 100 and in part on the server 101, to retrieve data from the server 101 asynchronously in the background without interfering with the display and behavior of existing web pages of the terminal device 100, serving as presentation tiers to users at the terminal device 100.

The user may start navigating the plan selector by clicking on a button labeled "Start Building" 201 on the web page. As the user starts navigating the plan selector on the web page, a Hypertext Transfer Protocol (HTTP) call to the server 101 is made to obtain information about available service plans from a database 102, for example, a database of the mobile carrier or wireless service provider. Upon retrieval of information relating to the available service plans, the server 101 may return responses in Extensible Markup Language (XML) to the terminal device 100, which may be parsed and stored in memory of the terminal device 100. Those who are ordinarily skilled in the art may recognize that, in addition to XML, various different types of mark-up languages and software programming techniques including HTML, JavaScript, other variants, and the like can be used to implement the responses. For illustration, a basic structure of a response from the server 101, implemented in XML as repeated nodes of the structure, is shown below.

A Basic Structure of Exemplary XML Responses is as follows:

```
<plans>
<plans>
...
-<plan>
<type>2</type>
<typename>Family</typename>
<subtype>22</subtype>
<subtypename>Family Basic</subtypename>
<plancatid>323</plancatid>
<plancatname>Nationwide Basic</plancatname>
<billingcode>73412</billingcode>
<marketid>6588</marketid>
<monthlyminutes>700</monthlyminutes>
<addlminutefee>0.45</addlminutefee>
<monthlyfee>60</monthlyfee>
<seclinefee>9.99</seclinefee>
</plan>
-<plan>
<type>2</type>
<typename>Family</typename>
<subtype>22</subtype>
<subtypename>Family Basic</subtypename>
<plancatid>323</plancatid>
<plancatname>Nationwide Basic</plancatname>
<billingcode>73414</billingcode>
<marketid>6588</marketid>
<monthlyminutes>1400</monthlyminutes>
<addlminutefee>0.40</addlminutefee>
<monthlyfee>80</monthlyfee>
<seclinefee>9.99</seclinefee>
</plan>
...
</plans>
```

As previously discussed, the server 101 is connected to the database 102 containing a variety of matters needed for processing. Information for processing such as available service plans, pricing information, fee information, other service plan configuration data, etc. is obtained by the server 101 via an automated process. For example, to obtain the available service plans and other related information including the fee information from the database 102, the server 101 may execute a Procedural Language/Structured Query Language (PL/SQL) script for retrieving the needed information from the database 102. Those skilled in the art will recognize that PL/SQL is Oracle Corporation's proprietary procedural extension to the SQL database language, which is used in the Oracle database, and that other structural query languages may be used if other database and its management system are used in its place. For illustration purposes, an exemplary PL/SQL Script for retrieving the information from the database 102 is shown below.

An Exemplary PL/SQL Script for Retrieving Information from a Database is as follows:

SELECT xxx.plan_category_type_id,xxx.plan_category_type_name,xxx.plan_category_subtype_id, xxx.plan_category_subtype_name,xxx.plan_category_id,xxx.display_name, a.one_year_billing_code, a.plan_category_market_id,a.additional_minutefee, a.monthly_minutes, a.monthly_fee,yyy.monthly_fee as seclinefee
FROM plan a, plan_category_market b,
 (select pcm.display_name, pcm.actual_name, pcm.plan_category_id,

```
pct.plan_category_type_name,    pct.plan_category_
   type_id,
pcs.plan_category_subtype_name,    pcs.plan_catego-
   ry_subtype_id
FROM plan_category_subtype pcs,
   plan_category_type pct,
   plan_category_subtype_map pcsm,
   plan_category_master pcm
WHERE
   pcs.plan_category_type_id=pct.plan_category_
      type_id and
   pcs.plan_category_subtype_id=pcsm.plan_ catego-
      ry_subtype_id and
   pcsm.plan_category_id=pcm.plan_category_id and
   pct.plan_category_typeid=2) xxx,
      (SELECT c.plan_id,c.monthly_fee FROM family_
         secondary_plan c) yyy
WHERE a.plan_category_market_id=b.plan_category_
   market_id AND
   (a.display_b2c_flag='Y' OR a.display_b2e_flag='Y')
      AND
   b.plan_category_id=xxx.plan_category_id AND
   b.market_id=?
AND EXISTS (SELECT c.monthly_fee FROM family_
   secondary_plan c
      WHERE    a.plan_id=c.plan_id    and
      yyy.plan_id=a.plan_id)
ORDER BY plan_category_type_id, plan_category_id,
   plan_category_subtype_id;
```

Figure 5B:
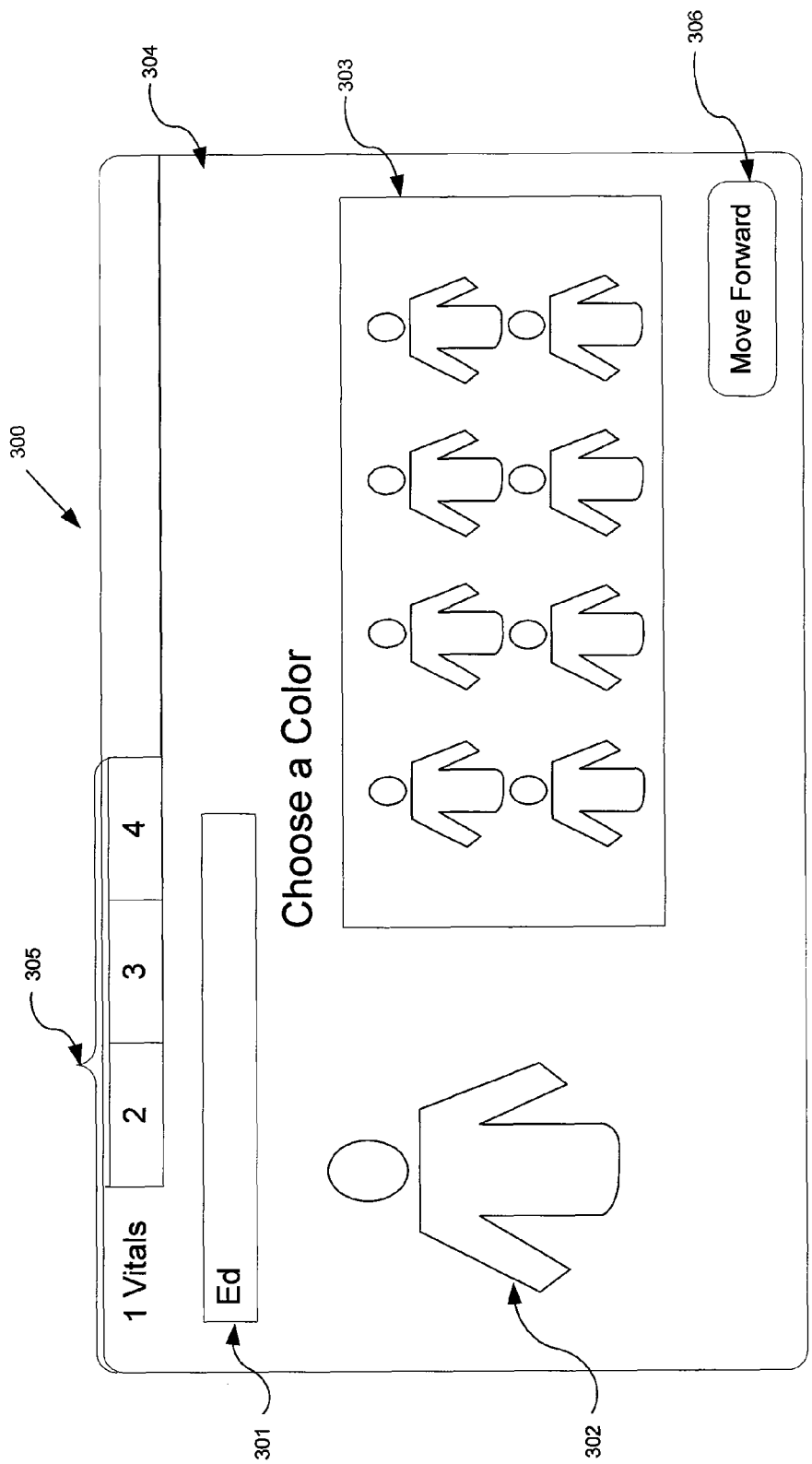

At S0 of FIG. 2A, the user may start navigating the plan selector by clicking on a button labeled "Start Building" 201 on the start-up page 200 of the plan selector (in FIG. 5A). The server 101 then sends data to the terminal device 100 for presenting to the user a graphical user interface (GUI) 300 for entering projected user requirements as user inputs (as in 51 of FIG. 2A and shown in FIG. 5B). First, the user is prompted to enter name of the first person to be added to a service plan into a name field 301 and select a color of an avatar image 302 representing the named person among a variety of different color choices 303. In addition, if special characters, for example, "$," "#," "@," "%," etc., are entered into the name field 301, a dynamic text message (not shown) is displayed and the user is prompted to reenter the name using letters and numbers. Alternatively, when special characters are entered into the name field 301, other forms of dynamic messages including audio messages, visual messages, audio plus text messages, audio plus visual message, or any other combination of different types of messages may be implemented and displayed to the user. Also, as the user selects the color of the avatar image 302, colors of borders 304 and tabs 305 of the GUI 300 will automatically change to match the color of the selected avatar image 302. To proceed to a next step, the user may either click on a button labeled "Move Forward" 306 or click on a tab 305 on the GUI 300.

Figure 5C:
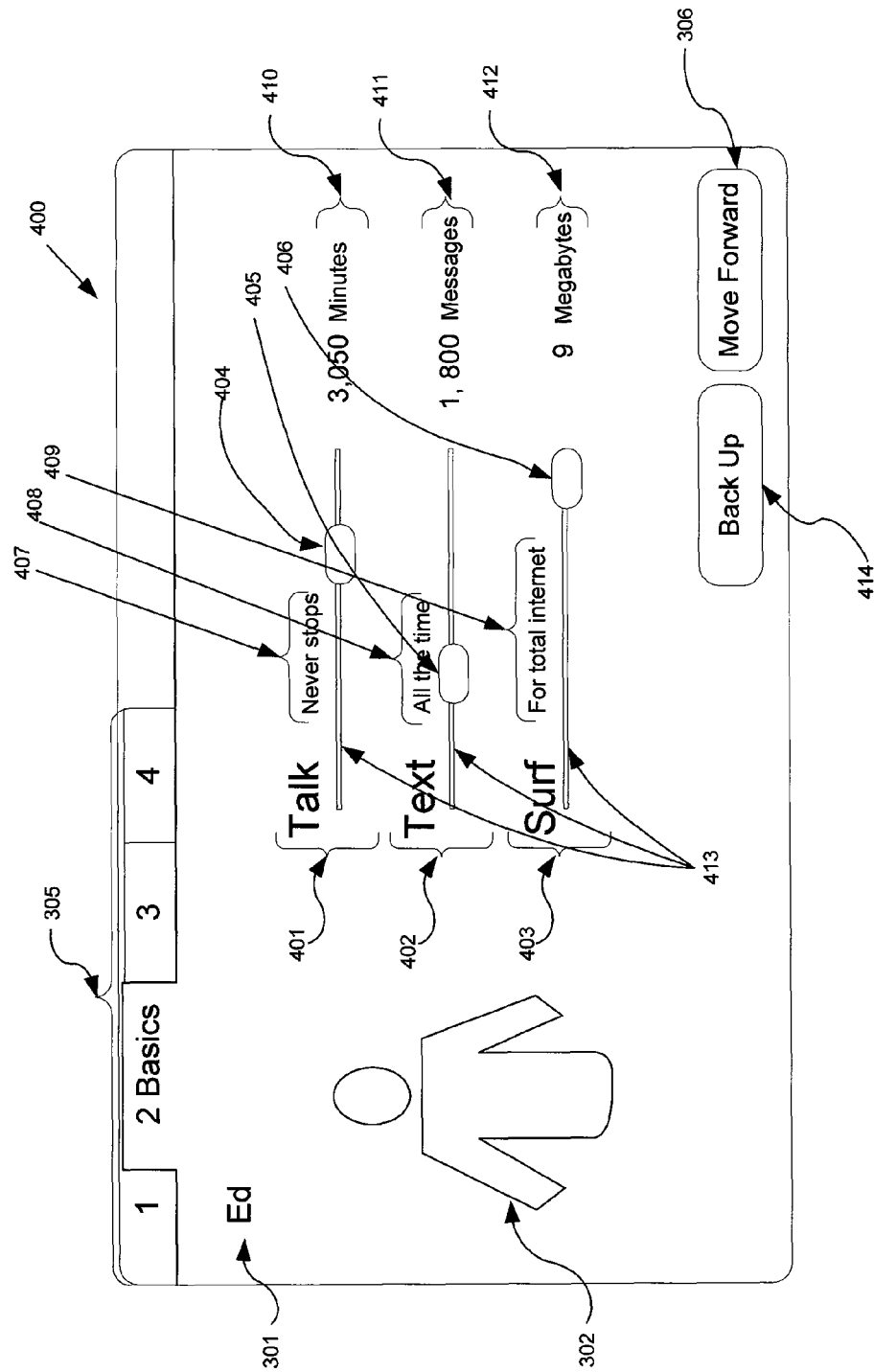

Next, as in S2 of FIG. 2A and shown in FIG. 5C, the user is presented with a GUI 400, e.g., a "2 Basic" tab, for entering projected usage levels of mobile services for the named person in S1 of FIG. 2A. Some examples of mobile services include, but are not limited to, mobile voice communication service (e.g. voice calls), mobile data communication service (e.g. text, picture, instant messaging, etc.), multimedia communication service (e.g. video telephony, multimedia messaging, etc), and mobile Internet service. In the example and as shown in FIG. 5C, mobile voice communication service (represented by a "Talk" category 401 in FIG. 5C), mobile data communication service (represented by a "Text" category 402 in FIG. 5C), and mobile Internet service (represented by a "Surf" category 403 in FIG. 5C) are shown as mobile services available, of which the user may input projected usage requirements or projected usage levels.

For example, in FIG. 5C, the "Talk" category 401 represents the mobile voice communication service. The usage under the "Talk" category 401 includes, for example, but is not limited to, air-time or anytime minutes for domestic voice calls from the mobile carrier or wireless service provider nationwide rate and coverage area. To input the projected usage level of the mobile voice communication service, the user may point or click and drag on the graphical user interface to operate a sliding bar 404 for the "Talk" category 401. The projected usage level of the "Talk" category 401 is measured and inputted in anytime minutes per month. As the user moves the sliding bar 404 for the mobile voice communication service, a numerical representation 410 of an amount of the projected usage under the "Talk" category 401 in minutes is made and displayed to the user and also a dynamic text message 407 corresponding to the desired level of the projected usage of the mobile voice communication service is displayed, e.g., different text messages are displayed corresponding to different levels of projected usage of the mobile voice communication service. For example, a text message 407 such as "Not too chatty," "Quite a talker," or "Never stops" is displayed depending on the amount of the projected usage of the "Talk" category 401 inputted by operating the sliding bar 404.

As shown in FIG. 5C, the "Text" category 402 on the GUI 400 represents the mobile data communication service. The usage under the "Text" category 402 includes, for example, but is not limited to, text messages, picture messages, video messages, and instant messages that are sent to other wireless phone numbers or email addresses as well as those received. To input the projected usage level of mobile data communication service, the user may operate a sliding bar 405 for the "Text" category 402. The projected usage level of the "Text" category 402 is measured and inputted in the number of messages per month. As the user moves the sliding bar 405 for the "Text" category 402, a numerical representation 411 of the projected usage of the "Text" category 402 in the number of messages per month is made and displayed to the user. Also, a text message 408 corresponding to different levels of projected usage of the mobile data communication service is dynamically displayed. For example, a text message 408 such as "Not so much," "All the time," or "Till it hurts!" is displayed depending on the amount of the projected usage of the "Text" category 402 inputted by operating the sliding bar 405.

As shown in FIG. 5C, the "Surf" category 403 represents the mobile Internet service. The usage under the "Surf" category 403 includes, but is not limited to, accessing Internet, viewing web pages, uploading or downloading songs, and etc. To input the projected usage level of the mobile Internet service, the user may operate a sliding bar 406 for the "Surf" category 403. The projected usage level of the "Surf" category 403 is measured and inputted in megabytes. As the user moves the sliding bar 406 for the "Surf" category 403, a numerical representation 412 of the projected usage of the "Surf" category 403 in megabytes per month is made and displayed to the user. Also, a text message 409 corresponding to a different level of the projected usage of the mobile Internet service is displayed. For example, a text message 409 such as "For lots of email (0-3 MB)," "For downloads, etc (4-7 MB)," or "For total Internet! (8-10+MB)" is displayed depending on the amount of the projected usage of the "Surf" category inputted by operating the sliding bar 406.

In the example, the user inputs the projected usage levels of the mobile services by moving respective sliding bars 404, 405, 406 to their desired levels. Alternatively, those skilled in the art may recognize that different techniques and forms such as buttons, direct inputs, etc. can be used for implementation. Further, sliders 413 may be filled in with the same color as that of the avatar image 302 and the numerical representations 410, 411, and 412 are made in the same color as well.

The user may go back to a previous step by clicking on a button labeled "Back Up" 414 or proceed to a next step by clicking on a button labeled "Move Forward" 306.

After entering the projected usage levels of the mobile services as user inputs (at S2 of FIG. 2A), the user may add enhanced data services available from the mobile carrier or wireless service provider in S3 of FIG. 2A. Currently, there are a variety of enhanced data services available from mobile carriers or wireless service providers. For illustration purposes, in the example, the enhanced data services include, but are not limited to, high-speed data transfer services, location based services, and wireless electronic mail (email) services. The high-speed data transfer service may include a streaming video broadcast service, which includes a premium cable level streaming video broadcast service. The location based service includes a GPS navigation application and the wireless email service includes a mobile email service. For example, the user can proceed to add enhanced data services either by clicking on a button labeled "Move Forward" 306 of the GUI 400 or by clicking on a tab on the GUI 500, e.g., a "3 Sweeteners" tab 504. Although not shown for convenience, the GUI 500 may also show tool tips for the sweeteners, which give the user more information about the given service.

Figure 5D:
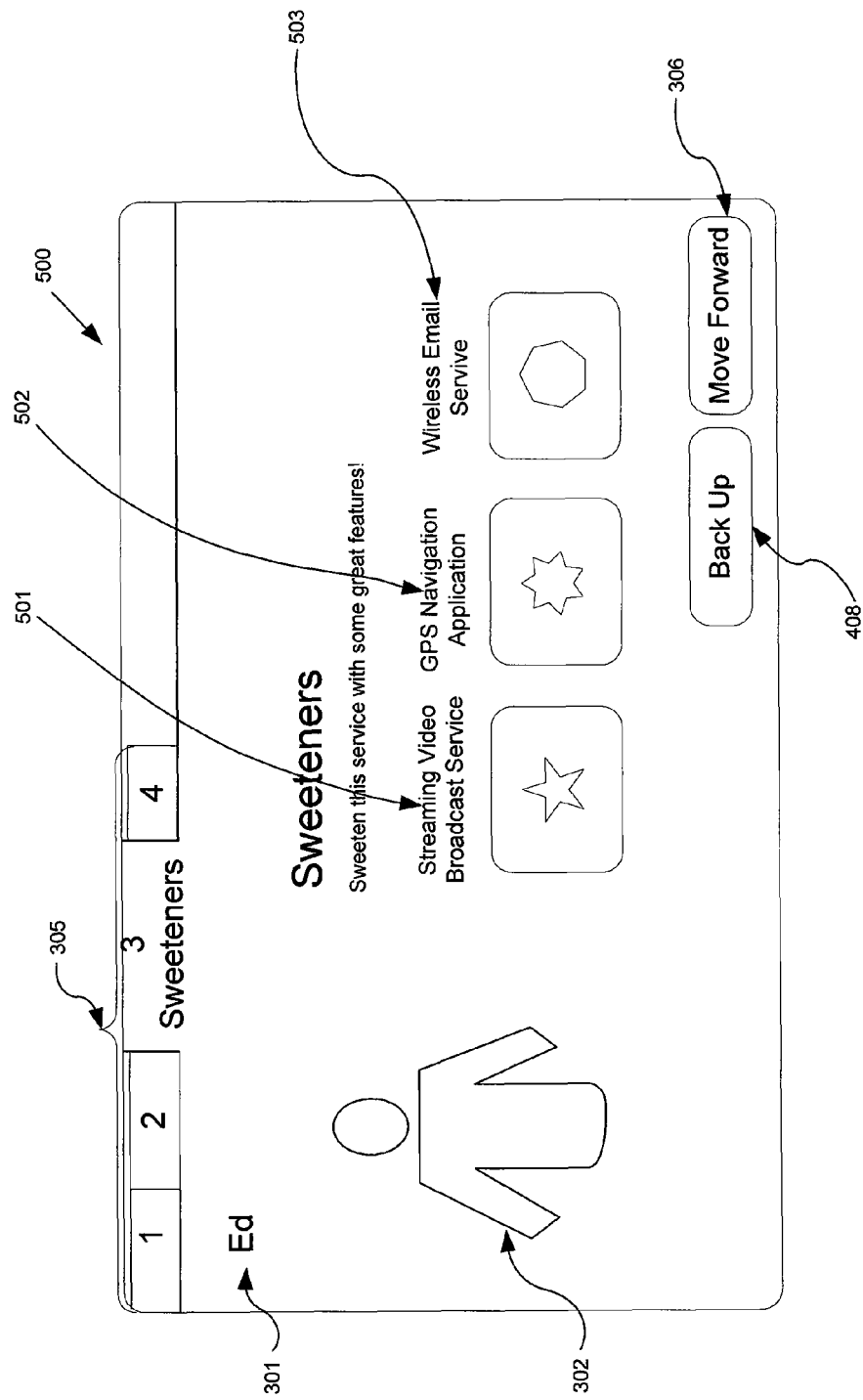

At S3 of FIG. 2A and shown in FIG. 5D, the user may select or add enhanced services available from the mobile carrier or wireless service provider. FIG. 5D is an exemplary display of a GUI showing some examples of enhanced services such as enhanced data services for user selection, e.g., a streaming video broadcast service 501, a GPS navigation application 502, and a wireless email service 503. The streaming video broadcast service 501 provides for unlimited megabyte usage while exploring services such as V CAST Videos, ESPN MVP, Mobile Web, Get It Now/Media Center applications, and the like. The GPS navigation application 502 provides for an advanced GPS-based navigation system on a mobile phone, BlackBerry® or Window Mobile device, and the like, for spoken turn-by-turn directions, maps, local point of interest search services. The wireless email service 503 provides for access to email services including Yahoo! Mail, Windows Live Mail, AOL, AIM, Verizon.net, etc., and the like. Based upon the projected needs or desires, the user may select none or select one or more of the enhanced services presented to the user for selection and addition to a service plan. The user may also go back to the previous step of S2 of FIG. 2A by clicking on a button labeled "Back Up" 408.

Figure 5E:
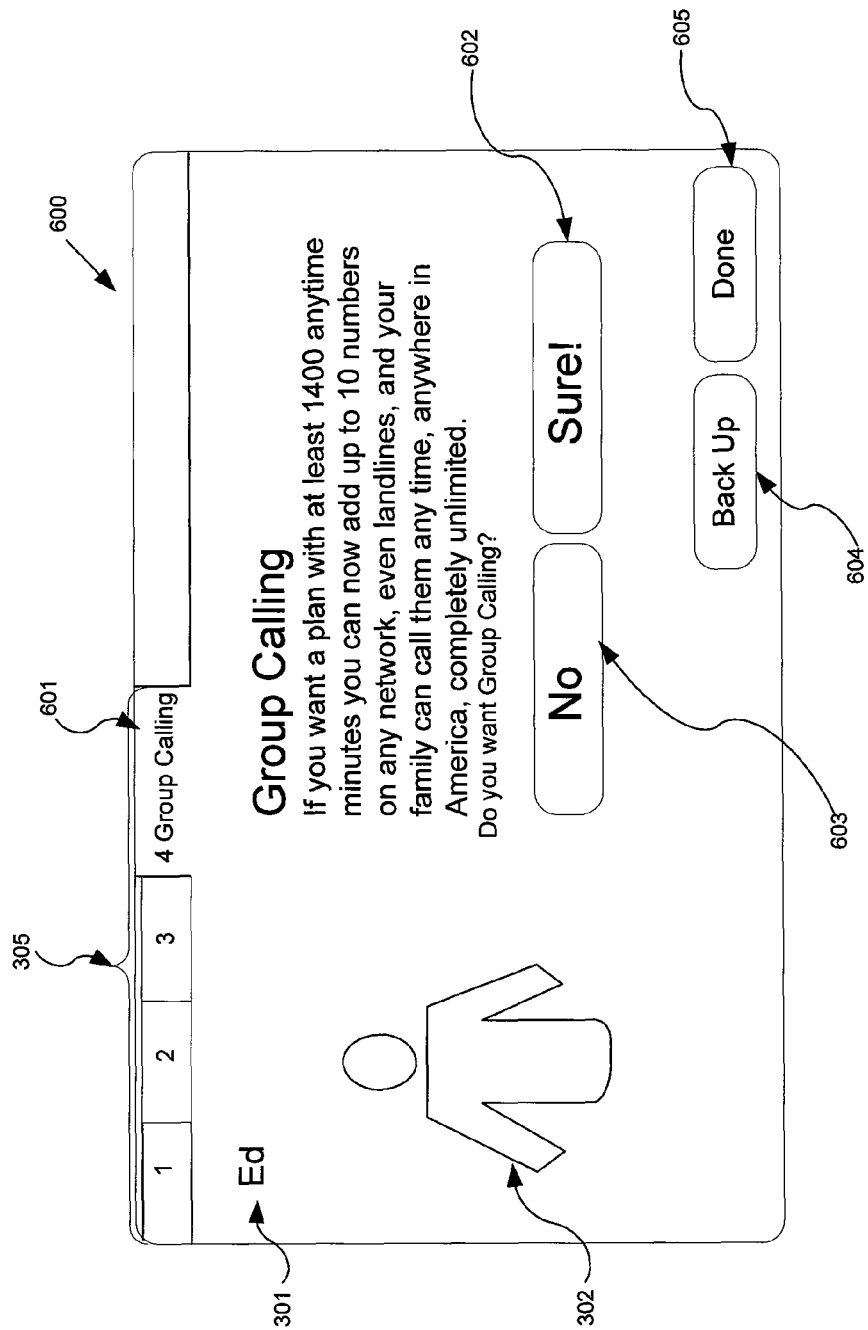

At S4 of FIG. 2A, if the user at the terminal device is adding the first person to a service plan, the plan selector provides the user with an option to select a group calling feature as shown in FIG. 5E (a branch to S6 of FIG. 2A). If the user is adding an additional person after the first person (at S5 of FIG. 2A), then the steps S1-3 of FIG. 2A are repeated. The group calling in the example may be referred to as "calling circle" or "family circle" and is a feature on a service plan that allows a subscriber to choose up to a certain number of telephone numbers on any network to call free without using the subscriber's minutes in the service plan. On a Group Calling tab 601, the user may select the group calling feature by clicking on a button labeled "Sure" 602 or decide not to get the feature by clicking on a button labeled "No" 603. Also, the user can go back to the previous step by clicking on a button labeled "Back Up" 604 or proceed forward by clicking on a button labeled "Done" 605 as in S7 of FIG. 2A. In the example, for Verizon Wireless customers, if the group calling feature is selected, then "10" is automatically entered for the maximum number of telephone numbers for the feature and if the user decides not to get the feature, on the other hand, then "0" is entered for the maximum number of telephone numbers for the feature.

At various points as the user navigates through the steps of FIG. 2A, information relating to the user inputs and a service plan suggested by the plan selector is presented to the user via a graphical user interface 700 (as shown in FIG. 5A) on the terminal device 100. An exemplary GUI 700 is termed herein as "Dashboard" and it provides to the user at the terminal device 100 information about total projected usage requirements inputted by the user and information relating to the selected service plan by the server 101 offering the lowest monthly cost to the user based on the total projected usage requirements and desired enhanced services inputted by the user. In the example, however, the plan selector requires that at least two persons or stations to be covered by a service plan before a service plan is selected and suggested, based on the inputted requirements, to the user at the terminal device 100 via the Dashboard. As shown and outlined in S9 of FIG. 2B, the server 101 determines a service plan based on user inputs. First, the server 101 receives the user inputs from the terminal device 100 (at S10 of FIG. 2B) and also retrieves information related to available service plans from a database 102 of a mobile carrier or wireless service provider (at S11 of FIG. 2B). The retrieved information can be stored in the local memory of the server 101 for later use by the server 101. Next, the server 101 processes the user inputs and retrieved information to calculate total monthly costs of available service plans from the mobile carrier or wireless service provider (at S12 of FIG. 2B). Among the total monthly costs of available service plans, then the server 101 selects a service plan offering the lowest total monthly cost as a selected service plan to be suggested to the user (at S13 of FIG. 2B). After the service plan is chosen, the server 101 sends, for presentation to the user via the Dashboard, to the terminal device 100 information relating to the selected or chosen service plan as a suggested service plan to the user based upon the projected usage levels and desired enhanced services (at S14 of FIG. 2B).

Figure 5F:
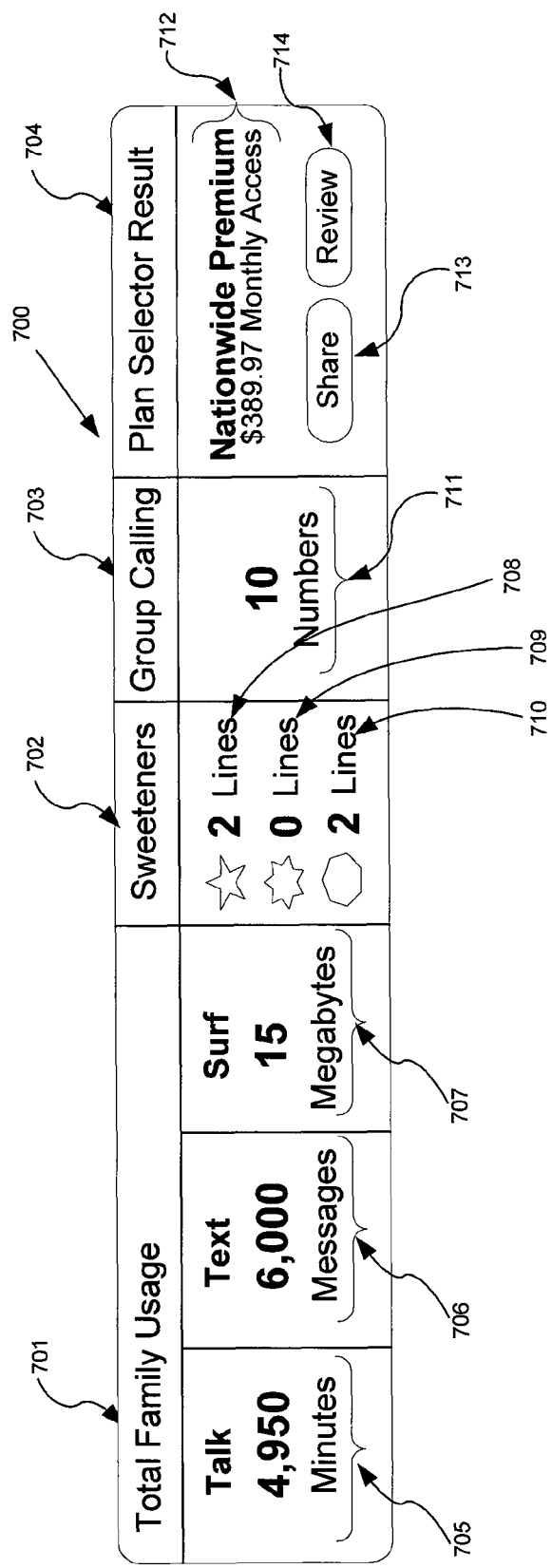

FIG. 5F shows the Dashboard consisting of "Total Family Usage" 701, "Sweeteners" 702, "Group Calling" 703, and "Plan Selector Result" 704 sections. The Dashboard is displayed on a screen to the user at the terminal device 100, for example, at a bottom of the screen of the terminal device 100, while the user is inputting projected usage requirements and other desired selections of enhanced services. As the user inputs the projected usage requirements and other selections of the enhanced services, the Dashboard information is updated in real-time and displayed to the user below the graphical user interface screens as shown in FIG. 5B-E at the terminal device 100.

The "Total Family Usage" section 701 of the Dashboard provides information regarding the total projected usage requirements of mobile services, each of the mobile services represented by "Talk" 705, "Text" 706, and "Surf" 707 subsections. For example, the "Talk" subsection 705 represents a total projected usage level of mobile voice communication service in minutes per month, the "Text" subsection 706 represents a total projected usage level of mobile data communication service in messages per month, and the "Surf" subsection 707 represents a total projected usage level of mobile Internet service in megabytes per month. The "Total Family Usage" section 701 of the Dashboard is updated in real-time, as changes are made to the total projected usage requirements as in S2-3 of FIG. 2A, or FIG. 3A-C. For example, as in FIG. 3A-C, the user may add an additional person to a service plan and add his or her projected usage requirements to the total projected usage requirements (as in FIG. 3A), or modify a person's projected usage requirements resulting in changes to the total projected usage requirements (as in FIG. 3C). When such changes are made, the corresponding total projected usage levels of the "Talk" 705, the "Text" 706, and the "Surf" 707 subsections are updated in real-time and displayed to the user on the Dashboard. Another option is to delete a person and his or her projected usage requirement from the service plan, if two or more users have already been input for the service plan selector. In such a case, the plan selector may present a "delete confirmation" page to the customer (not separately shown in the drawings).

The "Sweeteners" section 702 of the Dashboard as shown in FIG. 5F provides information regarding total numbers of selections of extra or enhanced services. For example, the "Sweeteners" section 702 displays a total number of selected high-speed data transfer services 708, e.g., a total number of streaming video broadcast services selected, a total number of selected location based services 709, e.g., a total number of GPS navigation applications selected, and a total number of selected wireless email services 710, e.g., a total number of mobile email services selected. The total numbers of the enhanced services selected 708, 709, 710 are updated in real-time as changes are made to selection of each enhanced service. For example, as the user selects an additional GPS navigation application for a person to be covered under a service plan, as in S3 of FIG. 2A, or in FIG. 3A or 3C, the "Sweeteners" information 702 of the Dashboard is updated in real-time showing an increase in the number of GPS navigation applications selected.

In the example, as previously discussed above, the Dashboard also displays in a "Group Calling" section 703 whether the group calling feature is selected or not by displaying an appropriate number of telephone numbers 711 covered under the feature.

The "Plan Selector Result" section 704 of the Dashboard, as shown in FIG. 5F, provides information relating to a selected service plan 712 and also provides the user with additional button options: a button labeled "Share" 713 to share the information with other persons, and a button labeled "Review" 714 to review details of the information relating to the selected service plan. As the server 101 makes a new suggestion of a selected service plan based on the user inputs, the "Plan Selector Result" section 704 is updated in real-time and updated information is displayed to the user via the "Plan Selector Result" section 704 of the Dashboard. For example, as in FIG. 3A-C, the user may want to modify projected usage requirements by adding another person to a service plan (following steps S51-52 of FIG. 3A), deleting a person from the service plan (following steps S61-62 of FIG. 3B), or editing projected usage requirements of a person (following steps S41-42 FIG. 3C). As the changes to projected usage requirements are made in accord with steps of FIG. 3A-C, the server 101 receives, from the user at the terminal device 100, the changes to the projected requirements as user inputs and processes them for determining a new chosen service plan based on the revised projected requirements. Upon determining a new chosen service plan resulting in the lowest total monthly cost to the user based on the revised projected usage requirements, the server 101 sends to the terminal device 100, via the network, information relating to the newly chosen service plan for updating the "Plan Selector Result" section 712 of the Dashboard as shown in FIG. 5F.

As previously discussed, when the user at the terminal device 100 enters projected usage requirements as user inputs, the server 101 receives the user inputs from the terminal device 100 via the network. Initially, the server 101 may retrieve from at least one database 102 information relating to available service plans from the mobile carrier or wireless service provider, including pricing and fee information of the available service plans. Although the server could make calls for data from the database 102 throughout the process, and for ease of discussion, some comments herein may reflect such an approach, for network and other efficiencies the server 101 may instead cache much of the data and thereby reduce the number of back end calls. For example, the server 101 may instead make calls to the database 102 when new data is available and then case the data. In any event, the server 101 obtains the information necessary to respond to the user (from the database or more likely from cache). Then, based upon the retrieved information and the projected usage requirements inputted by the user, the server 101 calculates total monthly costs of the available service plans and determines a service plan offering the lowest total monthly cost to the user as a selected service plan to be suggested to the user at the terminal device 100 via the network. The server 101 then sends, via the network, to the terminal device 100 information relating to the chosen service plan for presenting and displaying to the user as the suggested service plan on the Dashboard.

Having discussed some details of operation of the graphical user interfaces at the terminal device 100 by the user, it would be now helpful to discuss how a service plan is selected and suggested to the user by the server 101. For illustration purposes, let us assume that available service plans from a wireless service provider, e.g., Verizon Wireless, include four nationwide family plans such as basic, select, connect, and premium plans. Each of these service plans may have its own characteristics, as shown in Table 1. The database 102 contains, among others, information shown in Table 1. The server 101 uses the information in selecting a service plan based on projected usage requirements and other subscriber preference inputs as illustrated below.

TABLE 1

| Characteristics of Different Nationwide Service Plans | | | | |
|---|---|---|---|---|
| | Basic Plans | Select Plans | Connect Plans | Premium Plans |
| Monthly Access | Starting at $69.99/ 2 lines | Starting at $99.99/ 2 lines | Starting at $119.99/ 2 lines | Starting at $139.99/ 2 lines |
| Monthly Anytime Minutes | Starting at 700 | Starting at 700 | Starting at 700 | Starting at 700 |
| Unlimited Mobile to Mobile Minutes | Free | Free | Free | Free |
| Unlimited Night & Weekend Minutes | Free | Free | Free | Free |
| Domestic Long Distance Included | Free | Free | Free | Free |
| Web Browsing | $1.99/MB | $1.99/MB | Unlimited | Unlimited |
| Text Messaging | $0.20/ Message | Unlimited | Unlimited | Unlimited |
| Picture & Video Messaging | $0.25/ Message | Unlimited | Unlimited | Unlimited |
| Wireless Email Service | $5.00/line | $5.00/line | Free | Free |

TABLE 1-continued

Characteristics of Different Nationwide Service Plans

| | Basic Plans | Select Plans | Connect Plans | Premium Plans |
|---|---|---|---|---|
| Streaming Video Broadcast Service | $15.00/line | $15.00/line | $15.00/line | Free |
| GPS Navigation Application | $9.99/line | 9.99/line | 9.99/line | Free |
| Group Calling Feature Numbers | 10 Starting at $89.99/ 2 lines | 10 Starting at $119.99/ 2 lines | 10 Starting at $139.99/ 2 lines | 10 Starting at $159.99/ 2 lines |

Further, assume that air-time overage charge is $0.45 per minute. Then total monthly costs of the available service plans can be calculated according to an algorithm as follows:

Total Monthly Cost=monthly charge+[text messages]*
textCost+[additional lines]*secondlineFee+
[Overage 600 minutes overage]*0.45+[number
of lines needing email]*emailCost+[number of
lines needing email]*StreamingVideoCost+
[number of lines needing Navigator]*Navigator-
Cost, where [·] is determined by user inputs.

In the above algorithm, emailCost is set to zero for service plans where email is unlimited. Also, if Streaming Video Broadcast Service, GPS Navigation Application or Wireless Email Service is not selected by the user as a desired enhanced data service, then StreamingVideoCost, Navigator-Cost, or emailCost is set to zero, respectively.

Now, for illustration purposes, further assume that the user enters the following projected usage requirements as user inputs: a total of 1300 minutes of Talk time, 1000 minutes of Text messages, and 3 persons (or telephone lines) and all three telephone lines have Wireless Email Service, 2 telephone lines have Streaming Video Broadcast Service and 1 telephone line has GPS Navigation Application.

Using the algorithm described above and following steps of FIG. 2B, the server 101 processes the user inputs of the projected usage requirements and the retrieved information relating to the available service plans (for example, Basic 700 and Basic 1400), and calculates the total monthly costs of the available service plans as follows:

Basic 700: Total Monthly Cost=60.00+1000*0.20+
2*9.99+600*0.45+(3*5.00+2*15.00+1*9.99)=
$504.99, Basic 1400: Total Monthly Cost=80.00+1000*0.20+
2*9.99+0*0.45+(3*5.00+2*15.00+1*9.99)=$254.99.

Thus, in this simplified hypothetical scenario, the server 101 would select Basic 1400 as an optimal service plan because Basic 1400 would provide the user with the lowest monthly cost and as a result would send to the terminal device 100 information relating to the chosen service plan as a suggested service plan. The information relating to the Basic 1400, including the selected service plan and monthly total cost of the selected service plan, would be sent to the terminal device 100 for updating the "Plan Selector Result" 704 information on the Dashboard for the user, as shown in FIG. 5F.

Figure 5G:
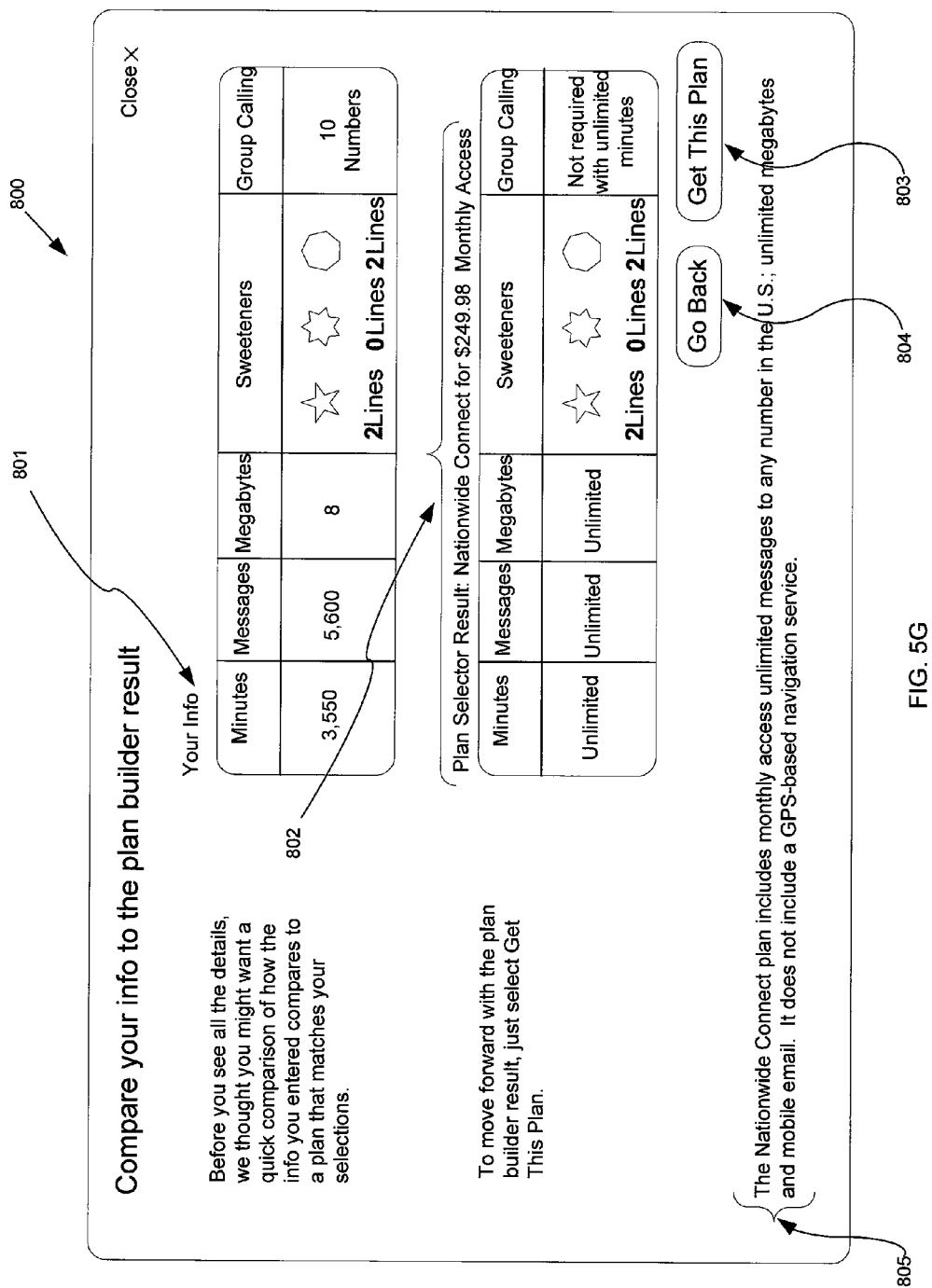

In FIG. 5F, the user is presented with two buttons on the Dashboard—one button 713 to share with others information relating to the selected service plan and another button 714 to review the information. Also, FIG. 4 shows an exemplary flow chart for the user to review and share with others the information relating to the selected service plan. When the "Review" button 714 is selected as in S34 of FIG. 4, the user is presented with a GUI 800 in FIG. 5G, which is transmitted by the server 101 to the terminal device 100 for presentation to the user via a network, displaying to the user a comparison information between what the user entered as total projected usage requirement and desired enhanced services into the plan selector 801 and what the plan selector returned as a selected service plan 802 based on the total projected usage requirement and desired enhanced services inputted by the user. Further, as shown in FIG. 5G, the server 101 may send a legal disclaimer 805 to the terminal device 100 for presenting to the user, as needed, at the bottom of the GUI 800, displaying the text of the legal disclaimer corresponding to the selected service plan 802. Upon reviewing the comparison information at S35 of FIG. 4, the user may proceed to purchase the selected service plan by clicking on a button labeled "Get This Plan" 803 (at S36 of FIG. 4), after which the user is directed to a plan selection web page for further purchase and selection of mobile devices and/or features (at S37 of FIG. 4). The user may also decide not to buy and go back to a previous step by clicking on a "Go Back" button 804 (at S35 of FIG. 4).

As shown in the "Plan Selector Result" section 704 of the Dashboard 700 in FIG. 5F, the user may decide to share with others the information relating to the selected service plan. The user can share with others by sending them a message through an electronic messaging service as described below. As those of ordinary skill in the art may recognize that the electronic messaging service may include, but is not limited to, an electronic mail (email) service, a short messaging service (SMS), an extended messaging service (EMS), and a multimedia messaging service (MMS). For illustration purposes, in the example, an electronic mail service is used for sharing with others the information relating to the selected service plan, but those skilled in the art will recognize that other messaging services may be used to share the information, such as SMS, EMS, or MMS.

Figure 5H:
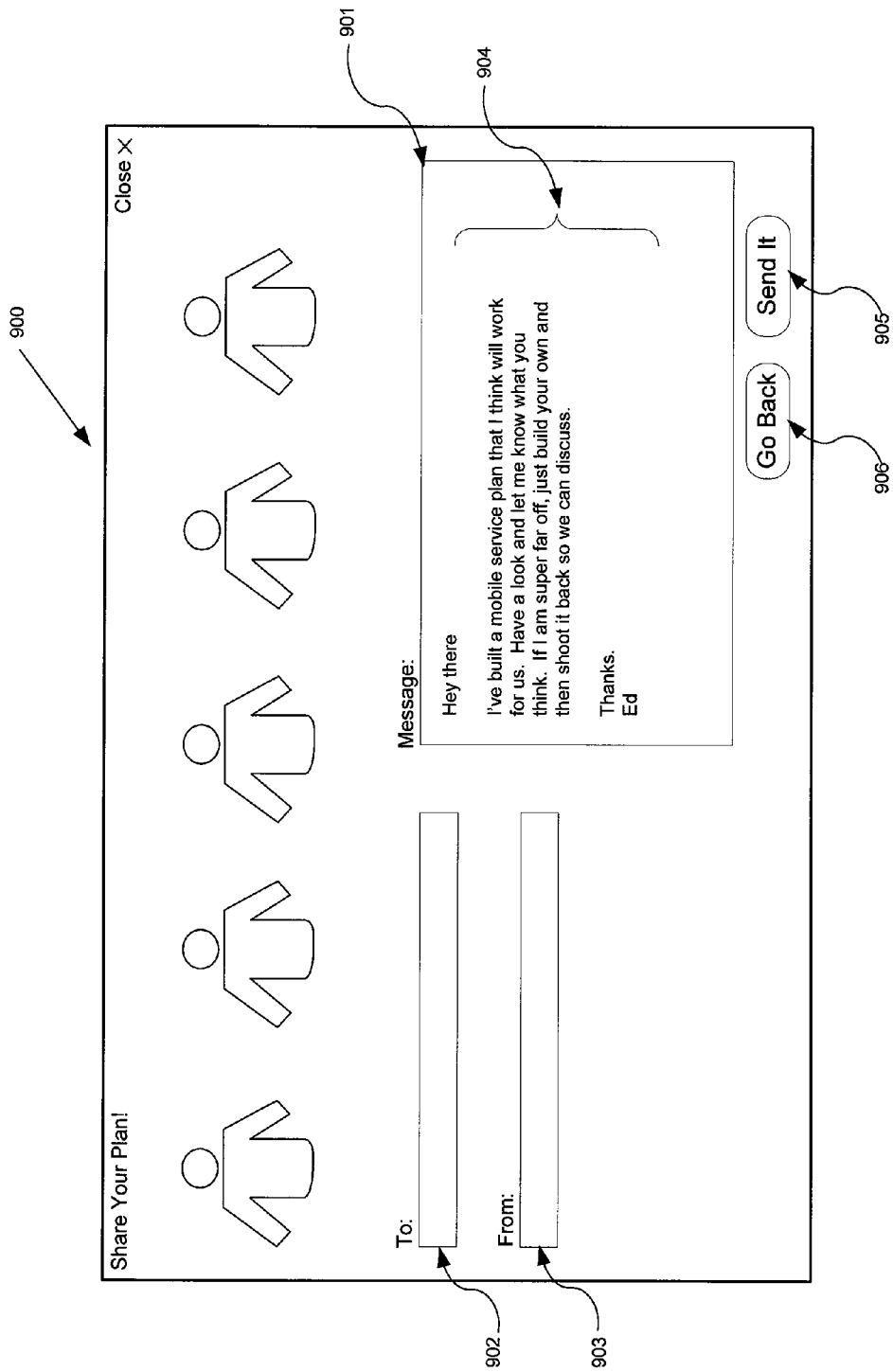

As in FIG. 5F and shown in S31-33 of FIG. 4, by clicking on a button labeled "Share" 713, the user may share with others the information relating to the selected service plan. Upon clicking on the "Share" button 713, the user is presented with a GUI 900 in FIG. 5H, which is transmitted by the sever 101 to the terminal device 100, via the network, for presentation to the user. The GUI 900 includes a message composition section 901, a recipient's email address field 902, and a sender's email address field 903. In the message composition section 901, a short exemplary text 904 including a complimentary closing may be dynamically populated for the user's convenience. After entering appropriate email addresses and composing a text message for the recipient (at S32 of FIG. 4), the user may send an email message to the recipient by clicking on a "Send it" button 905 (at S33 of FIG. 4). The terminal device 100 may validate the formatting of the electronic mail addresses. For example, the plan selector may not allow special characters in the To/From fields. After validating formatting, the terminal device 100 sends user inputs including the composed text message to the server 101. The server 101 then sends the composed email message to the recipient's email address, including the information relating to the selected service plan. Alternatively, at S31 of FIG. 4, the user may decide not to share the information and go back to a previous step by clicking on a "Go Back" button 906 as shown in FIG. 5H.

Figure 5I:
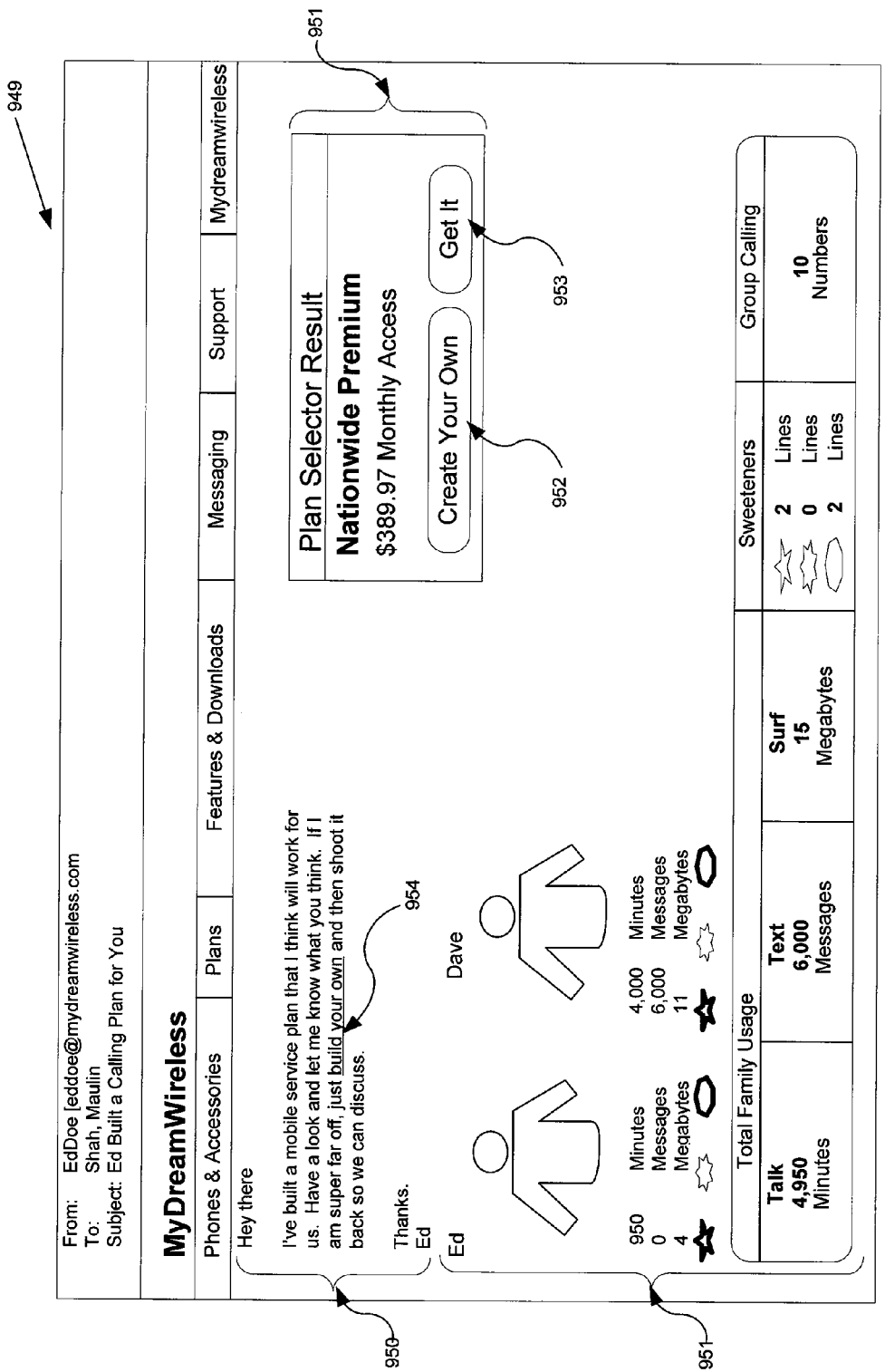

When a recipient receives an email message from the server 101, the email message may include, as shown in FIG. 5I, a text message 950, the information relating to the selected service plan 951, an embedded hyperlink 954 to the plan selector, a button labeled "Create Your Own" 952 for selecting a different service plan, and a button labeled "Get It" 953 for purchasing the selected service plan suggested in the email message. The recipient can review the information relating to the selected service plan and purchase the selected service plan in the email message, or the recipient can also select another service plan by clicking on a hyperlink 954 or the "Create Your Own" button 952, navigating through the plan selector, as described above, entering his or her own projected usage requirements and desired enhanced services.

As known in the data processing and communications arts, a general-purpose computer typically comprises a central processor or other processing device, an internal communication bus, various types of memory or storage media (RAM, ROM, EEPROM, cache memory, disk drives, etc.) for code and data storage, and one or more network interface cards or ports for communication purposes. The software functionalities for implementing the wireless service plan selection website involve programming, including executable code as well as associated stored data.

FIGS. 6 and 7 provide functional block diagram illustrations of general purpose computer hardware platforms. FIG. 6 illustrates a network or host computer platform, as may typically be used to implement a server such as the server 101 in FIG. 1. FIG. 7 depicts a computer with user interface elements, as may be used to implement a personal computer or other type of work station or terminal device, such as the terminal device 100, although the computer of FIG. 7 may also act as a server if appropriately programmed. It is believed that those skilled in the art are familiar with the structure, programming and general operation of such computer equipment.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming language of such servers are conventional in nature, and it is presumed that those skilled in the art are adequately familiar therewith. The server functions may also be implemented in a distributed fashion on a number of similar platforms, to distribute the processing loads.

Aspects of the methods of allowing a user to build and purchase a selected service plan based on projected usage requirements of the user at the terminal device 100, as outline above, may be embodied in programming. Program aspects of the technology may be considered as "products" or "articles of manufacture" typically in the form of executable code and/or associated data that is carried on or embodied in a type of machine readable medium.

Storage type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Another type of media that may bear the software includes optical, electrical and electromagnetic waves, such as used across physical interface between local devices, through wired and optical landline networks and over various air links. The physical elements that carry such waves, such as wired or wireless links, optical links or the like, also may be considered as media bearing the software. As used herein, unless restricted to tangible storage media, terms such as computer or machine readable medium refer to any medium that participates in providing instructions to a processor for execution.

Hence, a machine readable medium may take many forms, including but not limited to, a tangible storage medium, a carrier wave medium or a physical transmission medium. Nonvolatile storage media include, for example, optical or magnetic disks, such as any of the storage devices in any computer(s) or the like, such as may be used to implement the information flow control, etc. shown in the drawings. Volatile storage media include dynamic memory, such as main memory of such a computer platform. Tangible transmission media include coaxial cables, copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media, for example, therefore include: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one of more instructions and/or associated data to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method implemented on a computer connected to a network for allowing a user to choose a service plan of a mobile carrier or wireless service provider, the method comprising steps of:
   receiving user inputs, from the user via the network, of projected usage levels of a plurality of mobile services of the mobile carrier or wireless service provider, wherein the projected usage levels of the plurality of mobile services are for a group of persons intended for coverage by the chosen service plan;
   processing in the computer the user inputs of the projected usage levels of the plurality of mobile services and information related to a plurality of service plans available from the mobile carrier or wireless service provider, including fee information for usage of the plurality of mobile services to determine, as the chosen service plan, a service plan offering the lowest total monthly cost for the projected usage levels from among the plurality of available service plans for the projected usage levels;
   presenting to the user, via the network, information relating to the chosen service plan;
   sending to the user a message including an option for sharing with at least one other person the information relating to the chosen service plan through an electronic messaging service, the message requesting for the user to designate the at least one other person for sharing the information on the chosen service plan;

in response to the message, receiving data input from the user indicating contact information of a designated at least one other person; and based on the contact information, sending to the designated at least one other person, via the network, the information on the chosen service plan through the electronic messaging service.

2. The method of claim 1, further comprising:

prior to the step of processing, retrieving the information related to the plurality of service plans from at least one database, including the fee information for usage of the plurality of mobile services under each of the plurality of service plans.

3. The method of claim 1, wherein each of the plurality of mobile services is selected from the group consisting of a mobile voice communication service, a mobile data communication service, a multimedia mobile communication service, and a mobile Internet service.

4. The method of claim 1, wherein the information relating to the chosen service plan includes a total monthly cost of the chosen service plan for the projected usage levels.

5. The method of claim 1, further comprising:

sending to the user via the network a list of one or more available enhanced data services, for selection by the user; and receiving, from the user via the network, a selection of one or more of the enhanced data services, wherein the step of processing to determine the chosen service plan uses information on the selected enhanced data services in computing the total monthly cost.

6. The method of claim 5, wherein each of the enhanced data services is a service selected from the group consisting of a high-speed data transfer service, a GPS-based navigation service, and a mobile electronic mail service.

7. The method of claim 1, wherein the user inputs, received from the user via the network, of the projected usage levels of the plurality of mobile services, are received as a result of operation of a graphical user interface by the user.

8. The method of claim 1, wherein the step of processing in the computer the user inputs and the information related to the plurality of service plans to determine the service plan offering the lowest total monthly cost among the plurality of available service plans is performed in real-time as the user inputs are received.

9. The method of claim 7, wherein the step of receiving the user inputs, from the user via the network, of the projected usage levels of the plurality of mobile services comprises:

transmitting a web page representing the graphical user interface to the user, including options for user input of projected usage levels, for presentation to the user via a terminal device; and receiving data indicating the projected usage levels, from the terminal device, the data resulting from user interaction with the web page representing the graphical user interface on the terminal device.

10. The method of claim 9, wherein:

the sending step comprises transmitting a web page representing a graphical user interface for the option for sharing, for presentation to the user via the terminal device, wherein the electronic messaging service is selected from the group consisting of an electronic mail service, a short messaging service, and a multimedia messaging service; and the step of receiving data comprises receiving a user input via the network in response to the message, the user input resulting from user interaction with the web page representing the graphical user interface on the terminal device.

11. The method of claim 9, further comprising:

transmitting a second web page representing a second graphical user interface to the user, for a purchase decision of the chosen service plan, for presentation to the user via the terminal device; and receiving data indicating the purchase decision of the chosen service plan, from the terminal device, the data resulting from user interaction with the second web page representing the second graphical user interface on the terminal device.

12. The method of claim 1, wherein the step of receiving user inputs of projected usage levels comprises receiving from the user over the network information on estimated future usage amounts of a plurality of mobile services by a plurality of persons to be covered by the chosen service plan.

13. The method of claim 1, wherein the step of sending the message to the user regarding the option for sharing with the at least one other person comprises:

transmitting a web page representing a graphical user interface to the user, including input fields for contact information of the at least one other person and text messages, for presentation to the user via a terminal device; and receiving data indicating the contact information of the at least one other person and the text messages, from the terminal device, the data resulting from user interaction with the web page representing the graphical user interface on the terminal device.

14. The method of claim 1, wherein the step of sending to the designated at least one other person the information on the chosen service plan comprises:

transmitting a web page representing a graphical user interface to the designated at least one other person, including information on the chosen service plan and a plurality of options for the designated at least one other person to select in relation to the chosen service plan or another desired service plan.

15. The method of claim 14, wherein the plurality of options includes an option to create another service plan by the designated at least one other person.

16. A system, comprising:

a processor;

a machine readable storage medium accessible to the processor; and a program stored in the machine readable storage medium, wherein execution of the program by the processor causes the system to act as a computer to perform the steps of the method of claim 1.

17. An article of manufacture, comprising:

a machine readable storage medium; and executable program instructions embodied in the machine readable storage medium, wherein execution of the program instructions by a programmable system serving as a computer causes the computer to perform the steps of the method of claim 1.

* * * * *